United States Patent [19]
Lehmann

[11] 3,771,770
[45] Nov. 13, 1973

[54] APPARATUS FOR MAKING MOLDED ARTICLES FROM FOAMED SYNTHETIC MATERIAL

[75] Inventor: Walter Lehmann, Pleidelsheim, Germany

[73] Assignee: Mirabed A.G., Zug, Switzerland

[22] Filed: May 4, 1971

[21] Appl. No.: 140,117

[30] Foreign Application Priority Data
May 6, 1970 Germany.................. P 20 22 147.0

[52] U.S. Cl. .................................. 259/7, 23/252 R
[51] Int. Cl. .............................................. B01f 7/16
[58] Field of Search .................. 259/4, 7, 8, 154, 259/23, 24, 66, 67; 23/252 R

[56] References Cited
UNITED STATES PATENTS

| | | | |
|---|---|---|---|
| 3,212,128 | 10/1965 | Carlson et al. | 259/7 X |
| 3,312,374 | 4/1967 | Whitlock | 259/4 X |
| 2,893,602 | 7/1959 | Barber et al. | 259/154 |
| 2,263,797 | 11/1941 | Christensen | 259/154 |
| 2,915,301 | 12/1959 | Selden | 259/4 X |
| 3,092,882 | 6/1963 | Dietert | 259/154 X |
| 3,224,738 | 12/1965 | Tarukawa | 259/154 X |

Primary Examiner—Robert W. Jenkins
Assistant Examiner—Philip R. Coe
Attorney—James S. Hight, Herbert C. Brinkman, Jr., William G. Konold, Richard H. Evans, John D. Poffenberger and Bruce Tittel et al.

[57] ABSTRACT

A method of and apparatus for making molded articles from foamable synthetic substances, especially polyurethane, according to which the predosed major component of the foamable substance has admixed thereto a predosed additional component while said predosed major component and said predosed additional component are each in bulk introduced in a mixing container from which the thus made up foamable substance is introduced into a mold.

10 Claims, 3 Drawing Figures

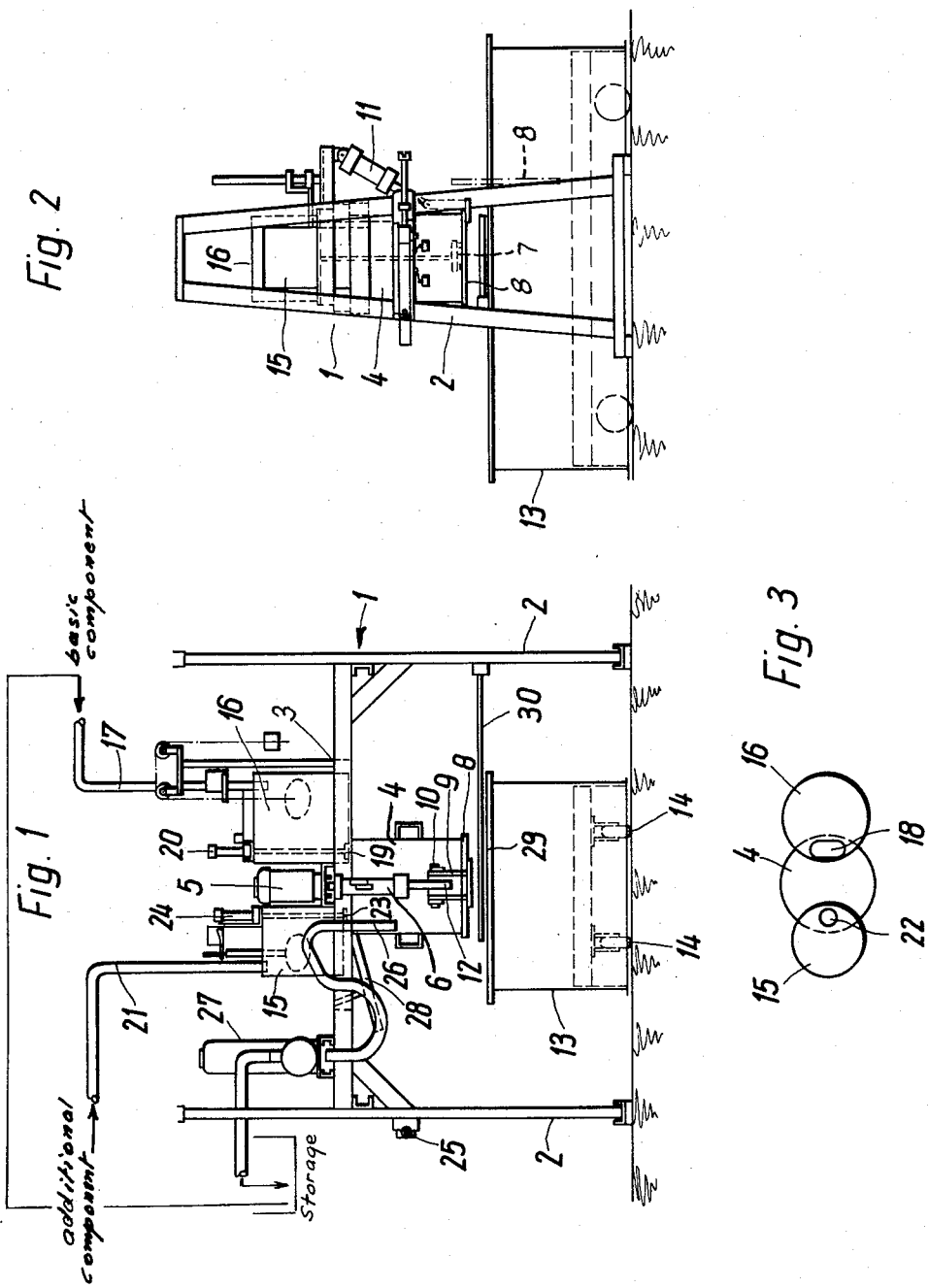

APPARATUS FOR MAKING MOLDED ARTICLES FROM FOAMED SYNTHETIC MATERIAL

The present invention relates to an apparatus for making molded articles from foamed synthetic material, especially polyurethane, by means of a mixing container for mixing the basic component of the foam material with at least one additional component.

When making molded articles of the type involved, the intermixing of the components and the filling of such mixture into the mold must be effected within a time period which is shorter than the so-called open time which means the time between the addition of the additional component to the basic component and the start of the foaming reaction. Heretofore, the conception prevailed that with the increase in volume of the composite mixture to be produced, also the time for preparing such mixture increases, and for this reason the quantity of the composite mixture to be employed and thereby the volume of the molded articles to be produced was limited by the so-called open time.

It is, therefore, an object of the present invention to provide an apparatus for making molded articles of foamed synthetic material which will permit to make up considerably greater quantities of a composite mixture than was heretofore possible, or to be able to cope with a shorter open time.

It is a further object of this invention so to produce a molded article of the type involved that the article will have a high homogeneity as to its density and foam structure.

These and other objects and advantages of the invention will appear more clearly from the following specification in connection with the accompanying drawing, in which:

FIG. 1 diagrammatically illustrates a view of an apparatus according to the present invention.

FIG. 2 shows the apparatus of FIG. 1 as seen from the left-hand side of the drawing.

FIG. 3 is a diagrammatic top view of a portion of the apparatus of FIG. 1.

The apparatus according to the present invention for making molded articles of foamed synthetic material, especially polyurethane, with a mixing container for intermixing the basic component of the foam material with at least one additional component is characterized primarily in that adjacent to the mixing container there is provided a predosing container substantially for each component which predosing containers communicate through valves directly with the mixing container while in the exit passage for the composite mixture from the mixing container and immediately adjacent thereto a mold for receiving the foam material may be provided.

In this way, the components can be precisely predosed and can then in a minimum of time be brought together in the mixing container and be thoroughly intermixed whereupon the thus produced composite mixture can immediately be transferred into the respective mold.

Advantageously, the invention is practiced in such a way that the dosed additional component is in bulk added to the dosed basic component which is subjected by agitation to a turbulence, while simultaneously the intermixing of the additional component with the basic component takes place. Immediately thereafter, the composite mixture is in bulk introduced into a mold. In this way practically any desired large quantity of a composite mixture can be made up within the open time because the components are instantaneously as entities brought together and the time period for the intermixing is substantially dependent only on the intensity of the agitating turbulence flow and practically not on the quantity of the composite mixture to be made up. In view of the fact that the components are brought together instantaneously and in view of the turbulence flow brought about by agitation, also a very homogeneous intermixing of the components and thus a high homogeneity of the finished molded articles will be assured.

In order after emptying the mixing container to avoid that residues of the composite mixture remaining in the mixing container will undergo a foaming reaction, the mixing container is immediately after it has been emptied, especially prior to the foaming in the mold, at least partially, preferably entirely filled with the basic component whereby without losses in material a rinsing or scavenging of the mixing container can be realized. The quantity of the basic component introduced into the mixing container can then by suction be dosed for the next mixing step. The sucked off portion of the basic component is expediently first returned to a storage container from which preferably the predosing container is fed for the basic component.

Referring now to the drawing in detail, FIGS. 1 and 2 show the apparatus according to the invention provided with a gate-shaped framework 1 which is formed by two lateral supports 2 which seen from the side have a trapezoidal contour, and by a horizontal frame-like transverse beam 3 interconnecting the supports 2.

Suspended on the transverse beam 3 and arranged in the central portion between the supports 2 there is provided a cylindrical mixing container 4 with a vertical axis. Above the mixing container 4 on the top side of the transverse beam 3 there is provided a motor 5 of a turbomixer 6, the motor being located along the central axis of the mixing container 4. The apparatus furthermore comprises a mixing head 7 which is located on the shaft of motor 5 which shaft extends downwardly into the mixing container 4, the mixing head 7 being located along the central axis of the mixing container 4. Mixing head 7 is located substantially in the lower portion of the mixing container 4 immediately above the bottom wall or flap 8 of the mixing container. The bottom wall 8 of the mixing container 4 is formed by a circular disc which is connected to arms 9. The arms 9 are pivotally mounted at 10 on the outside of the mixing container 4 for pivoting about a shaft which is perpendicular to the planes of the supports 2. In this way the bottom wall 8 can be pivoted into the position laterally of the mixing container 4, this position being indicated by dot-dash lines in FIG. 2. Linked to the bottom wall 8 is a pneumatic working cylinder 11 with a piston rod 12 by means of which the bottom wall 8 can pneumatically be pivoted in the desired manner. A mold 13 for receiving the material to be foamed may be moved between the supports 2 underneath the mixing container 4; the mold 13 may be provided with wheels 14. The contents of the mixing container 4 can by tilting the bottom wall 8 toward the side instantaneously be emptied into the mold 13. Immediately above the mixing container 4 or approximately mounted thereon are two cylindrical predosing containers 15, 16 which have a vertical axis and with regard to the central axis of the mixing container 4 are diametrically oppositely located with regard to each other. The container 16 which is the large container with respect to diameter and height serves for predosing the basic component of the composite mixture to be made up, the basic component being introduced through a conduit 17 which extends vertically downwardly into the container 16. For feeding the basic component there is provided a pump which is not shown in the drawing. Within the range of the predosing container 16 which faces toward the central axis of the mixing container 4, the bottom of container 16 is provided with a relatively large opening 18 adapted to be closed by a valve 19 which valve is adapted to be actuated, for instance, pneumatically be means of a working cylinder 20 provided at the top side of container 16.

Container 15 is in a corresponding manner in communication with a feeding line 21 for an additonal component and is adapted to be emptied into the mixing container 4 through an opening 22 in the bottom of container 15. Opening 22 is adapted to be closed by a valve 23 which in its turn is operable by the working cylinder 24. The cylinders 20, 24 and thus the valves 19, 23 and the working cylinder 11 are controlled by a program control 25.

When valve 19 is open, the predosed basic component is discharged from container 16 through opening 18 into the mixing container 4. The quanity may be so dosed that the mixing container 4 will be substantially completely filled. A suction line 26 extends from above downwardly into the mixing container 4 and is adjustable as to height and is also pivotable toward the side while being connected to a diaphragm pump 27 connected to the transverse beam 3. The pressure line of the diaphragm pump 27 leads to a storage container from which the conduit 17 is fed. Through line 26 such a quantity of the basic component is withdrawn from the mixing container 4 that in the mixing container 4 there will remain the precisely predetermined quantity of the basic component. Subsequently, the turbomixer 6 is started so that the basic component in the mixing container 4 will be exposed to a strong agitating turbulence. Subsequently, the valve 23 is opened whereby the additional component contained in container 15 will as an entity be discharged into the mixing container 4 where it will simultaneously be intermixed with the basic component. Immediately after the container 15 has been emptied, in other words after valve 23 is closed, a slide 28 is pneumatically moved underneath the opening 22 which slide is inclined outwardly and downwardly and by means of which drops are caught which might drop out of opening 22 from container 15. In this way post-dripping quantities of the additional component are prevented from not completely being intermixed with the basic component.

Prior to the addition of the additonal component in the mixing container 4, the suction line 26 is moved upwardly and tilted toward the side. Following the agitating and mixing time which is limited to a few seconds, the bottom wall or flap 8 is instantaneously opened so that the composite mixture will drop in bulk or as an entity into the mold 13 therebelow in which the foaming reaction can immediately start. Immediately following the emptying of the mixing container 4 and after the bottom flap 8 has been closed, the mixing container 4 is completely filled with the basic component so that residues of the composite mixture which are adapted to react will be rinsed or scavenged off the container walls. Thereupon, by means of the suction line 26, such a quantity is drawn from the mixing container 4 that the latter will agian contain the precisely predetermined dosed quantity which then can again in the above described manner be intermixed with the additional component.

If more than one additional component is required, a correspondingly greater number of predosing containers is employed. A drop-catching plate 29 is movable underneath the bottom side of the mixing container 4 which plate by means of an arm 30 is pivotally linked to one of the two supports 2 for pivoting about a vertical axis. After the contents of the mixing container 4 has been emptied into the mold 13, the drop-catching plate 29 is pivoted underneath the mixing container 4 so that residues are prevented from post-dripping into mold 13.

It is, of course, to be understood that the present invention is, by no means, limited to the particular showing in the drawing but also comprises any modifications within the scope of the appended claims.

What I claim is:

1. An apparatus for making in a mold molded articles of foamable substance, especially polyurethane, which includes: a plurality of predosing container means corresponding in number at least to the number of components to be intermixed to form said foamable substance so that there will be at least one predosing container means for each component of the respective foamable substance, means associated with said predosing container means for feeding the components of the respective foamable substance into said predosing containers, batch mixing container means arranged in the vicinity of said predosing container means for communication therewith, said mixing container means being sized so as to have a capacity to hold a batch of mixed material sufficient when foamed to fill the mold, means for selectively opening said predosing container means to said batch mixing container means, mixing means at least partially located within said mixing container means for stirring foamable components contained within said mixing container means, and said mixing container means having a discharge valve means selectively openable to a mold for discharging thereinto a batch of mixed foamable components from said mixing container means.

2. An apparatus according to claim 1, in which the predosing container means on one hand and the discharge means of said mixing container means on the other hand are provided on sides of the mixing container means which face away from each other.

3. An apparatus according to claim 1, in which the predosing container means are arranged at least in part above the mixing container means and are substantially uniformly distributed about the vertical central axis of said mixing container means.

4. An apparatus according to claim 3, in which the two groups of container means, namely predosing container means and mixing container means, at least the container means of one group has a substantially cylindrical configuration.

5. An apparatus according to claim 1, in which said mixing container means has inlet means, and in which the predosing container means includes outlet means located at least in part above said inlet means of said mixing container means, and valve means provided in said outlet means.

6. An apparatus according to claim 1, which includes movable drop catcher means arranged underneath the outlet means of at least one of said predosing container means, suction line means connectable to said mixing container means, pump means connected to said suction line means, said suction line means extending from the top into said mixing container means and being adjustable as to height up to a level above said mixing container means, and storage means for storing the major component of the foamable substance to be made up in said mixing container means, said suction line means leading into said storage means, said storage means communicating with the pertaining predosing container means for said major component.

7. An apparatus according to claim 1, which includes an agitating mechanism located at the top side of said mixing container means near the central axis thereof.

8. An apparatus according to claim 1, in which said discharge means of said mixing container means comprises the entire bottom wall of said mixing container means.

9. An apparatus according to claim 1, which includes a gate-shaped framework and in which said mixing container means and said predosing container means are provided on said gate-shaped framework.

10. An apparatus according to claim 9, in which said framework includes spaced gate supports, and which includes carriage means adapted to support a mold and movable between said gate supports.

* * * * *